United States Patent
Patrick

Patent Number: 6,137,610
Date of Patent: Oct. 24, 2000

[54] OPTICAL SYNCHRONIZATION ARRANGEMENT

[75] Inventor: David M Patrick, Colchester, United Kingdom

[73] Assignee: British Telecommunications public limited company, London, United Kingdom

[21] Appl. No.: 09/029,578
[22] PCT Filed: May 16, 1997
[86] PCT No.: PCT/GB97/01352
  § 371 Date: Mar. 6, 1998
  § 102(e) Date: Mar. 6, 1998
[87] PCT Pub. No.: WO97/44929
  PCT Pub. Date: Nov. 27, 1997

[30] Foreign Application Priority Data

May 22, 1996 [EP] European Pat. Off. ............. 96303664

[51] Int. Cl.[7] .......................... H04B 10/00; H04B 10/04
[52] U.S. Cl. ......................... 359/158; 359/161; 359/181
[58] Field of Search .................... 359/140, 158, 359/161, 330, 180, 181

[56] References Cited

U.S. PATENT DOCUMENTS

| | | | |
|---|---|---|---|
| 4,962,353 | 10/1990 | Takahashi et al. | 324/96 |
| 5,373,381 | 12/1994 | Alfano et al. | 359/108 |
| 5,473,458 | 12/1995 | Mamyshev et al. | 359/161 |
| 5,861,971 | 1/1999 | Devaux et al. | 359/176 |
| 5,999,287 | 12/1999 | Davies et al. | 359/118 |

FOREIGN PATENT DOCUMENTS

| | | |
|---|---|---|
| 619 658 | 11/1994 | European Pat. Off. . |
| 93 22855 | 11/1993 | WIPO . |
| 95 32568 | 11/1995 | WIPO . |

OTHER PUBLICATIONS

Patrick et al., "10 GHz Pulse Train Derived From A CW DFB Laser Using Crossphase Modulation In An optical Fibre", IEEE Electronic Letters, vol. 29 No. 15, Jul. 22, 1993.

Patrick et al., "Bit–Rate Flexible All–Optical Demultiplexing Using A Nonlinear optical loop Mirror", IEEE Electronic Letters, vol. 29 No. 8, Apr. 15, 1993.

Elecronics Letters, Jun. 4, 1987, UK, vol. 23, No. 12, pp. 629–630, Prucnal et al., "12.5 Gbit/s fiber–optic network using all–optical processing".

*Primary Examiner*—Jason Chan
*Assistant Examiner*—Dalzid Singh
*Attorney, Agent, or Firm*—Nixon & Venderhye P.C.

[57] ABSTRACT

An optical synchronization circuit includes a non-linear optical modulator (NOM). The signal to be synchronized and a reference signal interact within the NOM. Cross-phase modulation produces a spectral shift. The output from the NOM is filtered to produced an error signal.

11 Claims, 3 Drawing Sheets

OPTICAL SYNCHRONIZATION ARRANGEMENT

BACKGROUND OF THE INVENTION

The present invention relates to methods and circuits for synchronising optical signals, and to optical switches incorporating such circuits.

Synchronisation is an important issue in the design of high-speed optical switches for use in optical telecommunications, both in the context of a synchronous self-routing packet systems, and in synchronous OTDM systems. The use of a non-linear optical loop mirror (NOLM) incorporating an optical semiconductor positioned asymmetrically in the loop for demultiplexing a signal at bit rates as high as a TeraHertz has been demonstrated ["A TeraHertz optical asymmetric demultiplexer", Sokoloff et al, IEEE Photonics Technology Letters, 5 (1993) pp 787–790]. However, for effective functioning of such a switch, it is essential that synchronisation is maintained between the gating or control signal and the datastream which is to be switched. In practice, synchronisation can easily be lost, for example, because of thermal effects in the optical system.

SUMMARY OF THE INVENTION

According to a first aspect of the present invention, there is provided an optical synchronisation circuit comprising:

a) a non-linear optical modulator arranged to receive input signals comprising a signal to be synchronised and a reference signal, the NOM producing a spectrally-shifted output signal dependent on the relative timing of the said input air signals;

b) optical filter means for producing from the spectrally-shifted output signal an error signal having an amplitude dependent on the spectral shift in the output signal from the NOM; and a variable optical delay responsive to the error signal and arranged to apply a variable delay to the said signal to be synchronised.

The present inventors have found that the use of spectral shifts generated within a non-linear optical modulator to produce an error signal which in turn controls a variable delay offers a highly effective means of maintaining synchronisation between two optical signals. The circuit requires, moreover, only relatively simple, cheap and reliable components. The circuit is particularly suitable for use within a feedback loop for synchronisation of an optical switch, although it is not limited to use in this manner.

The non-linear optical modulator (NOM) may comprise a semiconductor optical amplifier, but preferably comprises an optical fibre arranged to support cross-phase modulation (XPM) between the two said input signals.

Preferably the output of the optical filter is applied to a photoelectric detector to produce an error signal in the electrical domain for use in controlling the variable delay. Although optionally, the circuit may operate entirely in the optical domain, the error signal will in general require a bandwidth considerably less than that of the signals being switched, and so can be converted to the electrical domain without significant loss in performance.

The variable optical delay may comprise a length of optical fibre mounted on an electro-mechanical device such as a fibre stretcher, or a linear delay stage. Preferably however, it comprises an array of discretely switchable optical elements. Preferably the said array comprises a plurality of opto-electronic switches coupled in series with respective delay elements and configurable to provide different optical delays. Preferably the different delays increase in generally exponential steps.

Alternatively, the variable optical delay may comprise a variable phase optical signal generator for generating an optical signal having a phase controlled in dependence on the error signal, and a further non-linear optical modulator connected to the output of the optical signal generator and arranged to receive the signal to be synchronised, in use the signal output by the optical signal generator cross-phase modulating the said signal to be synchronised in the further non-linear optical modulator.

According to a second aspect of the present invention, there is provided a method of synchronising optical signals, characterised by:

applying to a non-linear optical modulator (NOM) a reference signal and the signal to be synchronised and producing thereby a spectrally-shifted output signal;

filtering to spectrally-shifted output signal and producing thereby an error signal having an amplitude dependent on the spectral shift in the output signal from the NOM;

applying to the signal to be synchronised an optical delay varied in dependence upon the error signal.

According to a third aspect of the present invention, there is provided an optical switch for switching an optical pulse stream, characterised by an optical synchronisation circuit in accordance with the first aspect of the present invention connected on its input side and arranged to synchronise the incoming optical pulse stream to a reference optical signal.

Preferably the reference optical signal is the clock signal used to control the optical switch.

According to a fourth aspect of the present invention, there is provided a method of synchronising optical signals, characterised by applying the signal to be synchronised to a discrete offset non-linear element (NLE) of non-linear loop mirror, and applying a reference optical signal to the input port of the loop mirror, the offset of the NLE in the loop being such that wander in the signal to be synchronised is generally less than the switching window of the loop, and generating thereby a signal synchronised to the reference signal at the output port of the loop.

This aspect of the present invention provides an alternative approach to the synchronisation of optical signals. It uses the TOAD configuration disclosed in the paper by Sokoloff et al cited above. Conventionally, the TOAD-configured loop mirror has been used as a demultiplexer, with a control signal or clock applied to the NLE. The present inventors have realised however that if instead an "old" datastream, that is to say a datastream in need of synchronisation, is applied to the NLE, and if the offset of the NLE is large enough to provide a switching window which encompasses the wander in the old data, then the loop will provide at its output a re-timed datastream. As with the first aspect of the present invention, this is particularly valuable as a way of preparing input signals for an optical switch.

BRIEF DESCRIPTION OF THE DRAWINGS

Systems embodying the present invention will now be described in further detail, by way of example only, with reference to the accompanying drawings, in which.

DETAILED DESCRIPTION OF THE PREFERRED EMBODIMENTS

An optical switching circuit includes a photonic switch 1. The photonic switch may be, for example, a non-linear loop mirror such as that disclosed in the paper by Sokoloff, Prucnal et al. cited above, or may be a semiconductor device such as the switch disclosed in "Compact 40 Gbit/s optical demultiplexer using a GaInAsP optical demultiplexer", A D Ellis and D M Spirit, electronic letters, 29 (1993), pp 2115–2116. A clock signal fed to one input of the switch is gated by a data signal fed to the other input of the switch. The clock signal may be a locally generated or recovered signal, while the data signal might typically comprise a signal received from a remote source via a telecommunications network. Prior to being input to the switch, the data signal is treated by a synchronisation circuit.

The first stage of the synchronisation circuit comprises a length of non-linear optical fibre F coupled between wavelength division multiplexers WDM1, WDM2. A tap from the data input to the optical switch is coupled to the first WDM, as is a tap from the clock input. The fibre then functions as a non-linear optical modulator producing cross-phase modulation (XPM) between the two input signals. As a result of the XPM, the data signal is spectrally-shifted. This spectrally shifted signal is output from WDM2 to an optical filter 2. In this example, the filter is a tuneable bandpass filter of 1 nm width, such as that available commercially as JDS FITEL TB1500B. The signal from the filter is detected at a low speed photo-electric detector 3 having a bandwidth of a few 1 0's of kHz. This produces an electrical error signal having a magnitude dependent on the spectral shift in the NOM, which in turn depends on the magnitude of the timing error. This error signal is used to control an electromechanical fibre delay stage, which provides a variable delay in the data input to the switch. A suitable fibre delay is is that available commercially as JDS FITEL HD4 optical delay. In this manner, feedback from the synchronisation circuit drives the timing of the input datastream so as to maintain it in synchronism with the clock.

Figure 4:
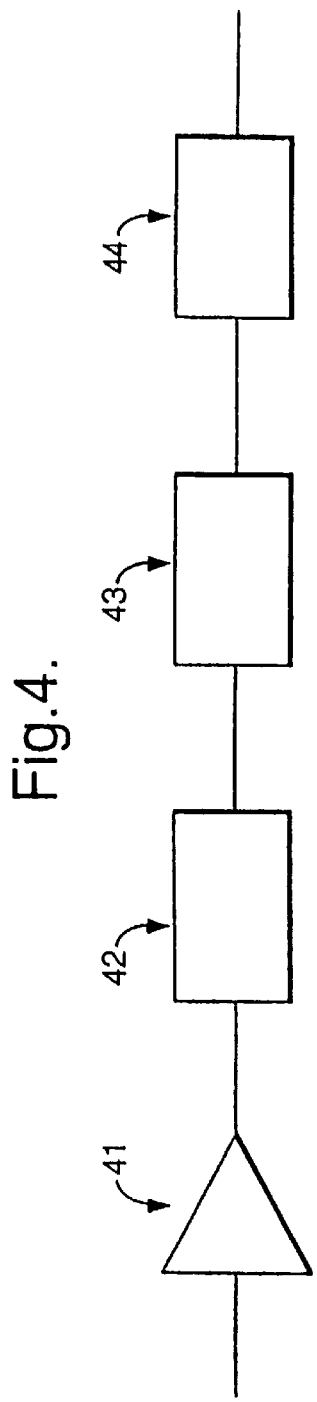
FIG. 4 is a schematic of detection and control circuits for use in the circuit of FIG. 1.

FIG. 4 shows in further detail the stages used to derive the control signal for the delay stage. A difference amplifier 41, which in this example is a discrete op-amp, takes the output of the photo-electric detector, eliminates the DC offset present in that output, and amplifies the variations in the output due to the spectral shifts. The resulting signal is fed to a comparator circuit 42 formed from two op-amps. This compares the signal voltage to a reference voltage. If the signal falls below the reference voltage then the output of the comparator is +5 V. If the signal is above the reference voltage, then the output of the comparator is −5 V. The next stage in the circuit is a hysteresis element. This is an op-amp with resistive feedback arranged to prevent oscillation of the voltage driving the delay stage. Finally, the output is amplified using a power amplifier in emitter follower configuration, and this drives the delay line driver circuit. This typically controls a stepper motor in a fibre stretcher, and activates the motor to increase the delay until the threshold in the control circuit is reached.

Figure 3:
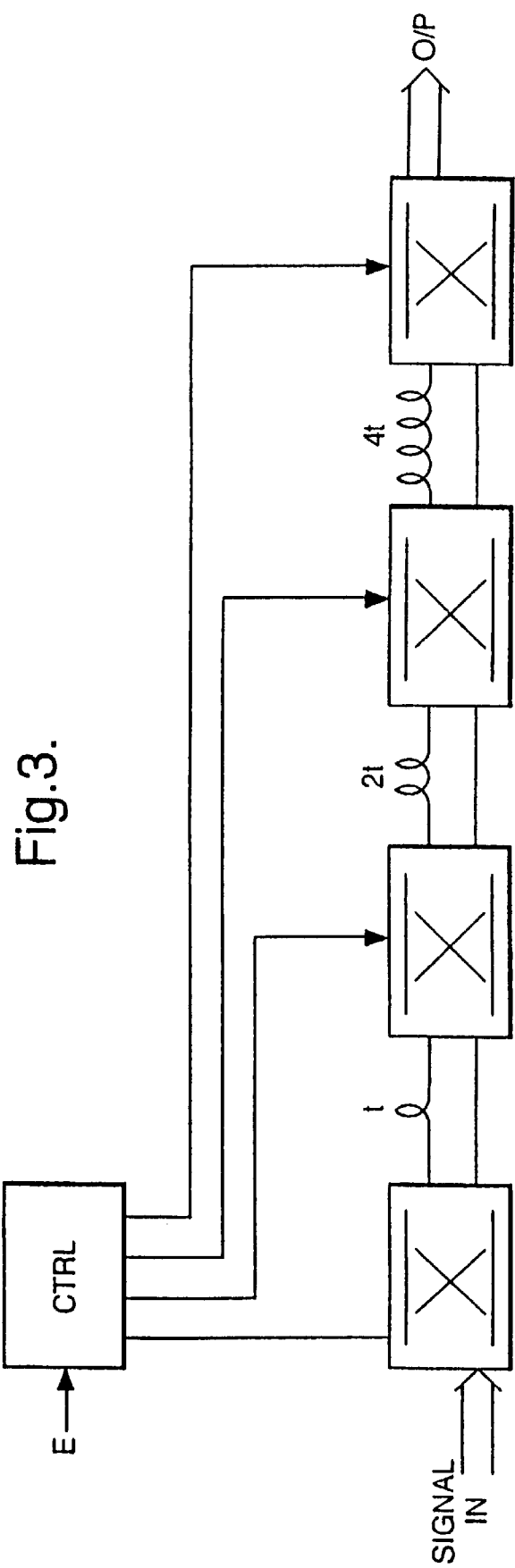
FIG. 3 is a schematic of an alternative delay stage for use in the circuit of FIG. 1.

As an alternative to the use of a mechanical delay, an array of 2×2 optical switches may be used to provide the variable delay. FIG. 3 shows a variable delay stage using such an array of switches. As shown in the Figure, the switches are connected in series and an optical fibre delay loop is connected between each adjacent pair of switches. The delay provided by the loop increases exponentially along the array, so that the delay between the first pair of switches is of value t, the delay between the next pair is of value 2t, the delay between the subsequent pair is 4t, and so on. A control circuit 32 driven by the error signal generates a binary control word which is applied in parallel to the switches and which has a magnitude proportional to the error signal. The switches are set in response to the control word to select or bypass the respective delay loop. The optical signal input to the beginning of the array, then passes through one or more of the delay loops according to the state of the switches and is output from the far end of the array.

Suitable 2×2 switches for use in such a delay stage are available commercially from JOS Fitel as model SR22.

Figure 5:
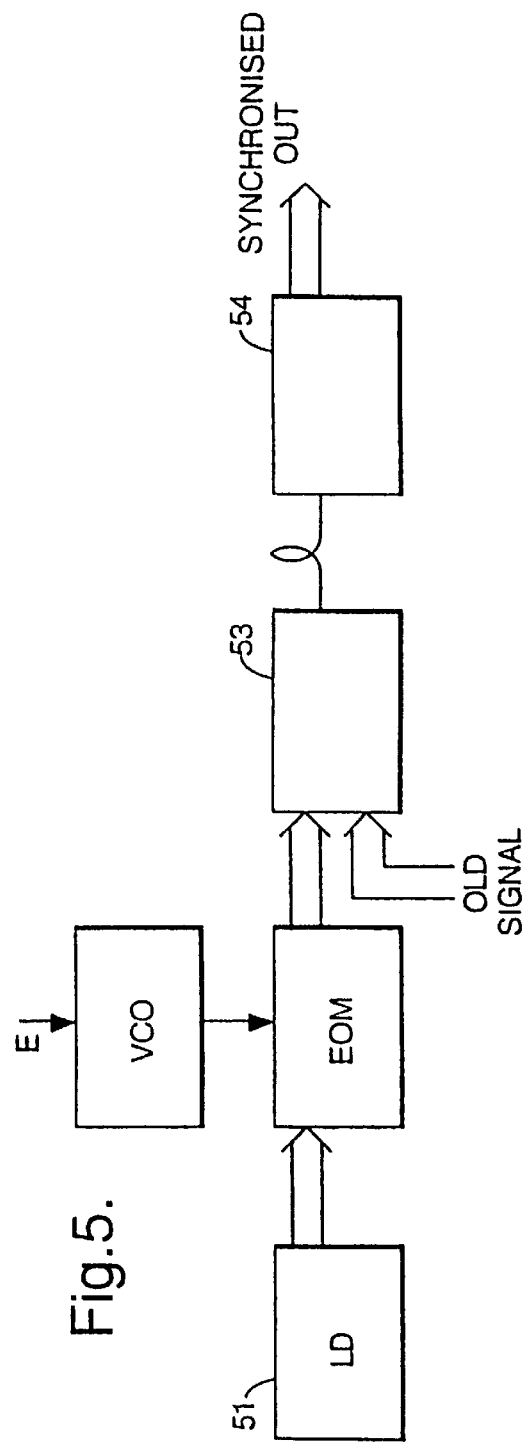
FIG. 5 is a schematic of a further alternative delay stage for use in the circuit of FIG. 1.

FIG. 5 shows a further alternative delay stage using, in this case, the process known as soliton shepherding. In this example, the error signal is used to determine the phase of an optical sine wave generated using an electro-optic modulator (EOM). In the present example, the modulator is a lithium niobate device. A local optical source, which in this example is a laser diode 51, outputs light which is coupled into the electro-optic modulator. The error signal is applied to a VCO (voltage controlled oscillator) operating at 10 Ghz , such as that available commercially as EMF 526004. This in turn outputs a drive signal to the gate of the EOM as a bias signal. This controls the phase of the optical sine wave output from the EOM. This optical sine wave is then input together with the signal to be delayed into a cross-phase modulation stage similar to that used to produce the spectral shift. As shown in the Figure, the stage comprises a length of non-linear optical fibre 52 coupled between a pair of WDM couplers 53, 54. Cross-phase modulation between the sine wave and the other optical signal delays the optical signal by an amount dependent on the phase of the sine wave, and hence on the error signal.

Figure 1:
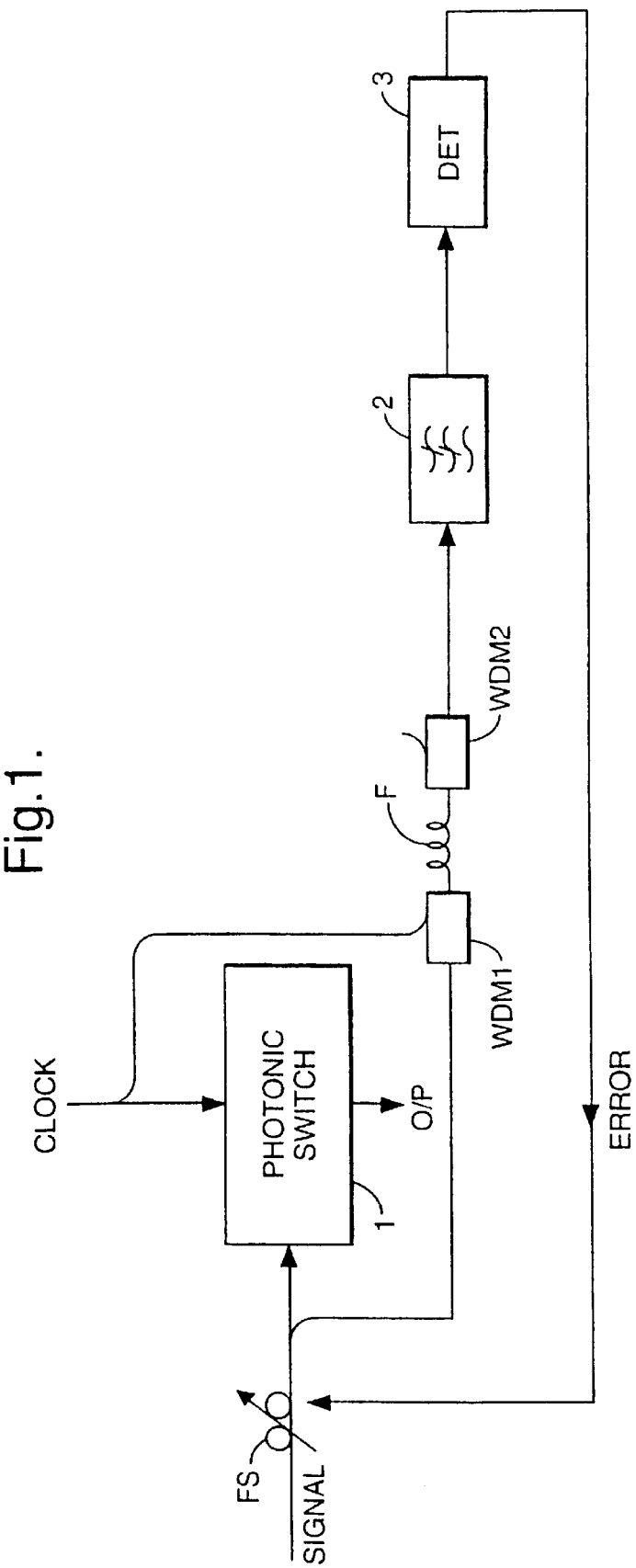
FIG. 1 is a schematic of a first circuit embodying the present invention.
Figure 2:
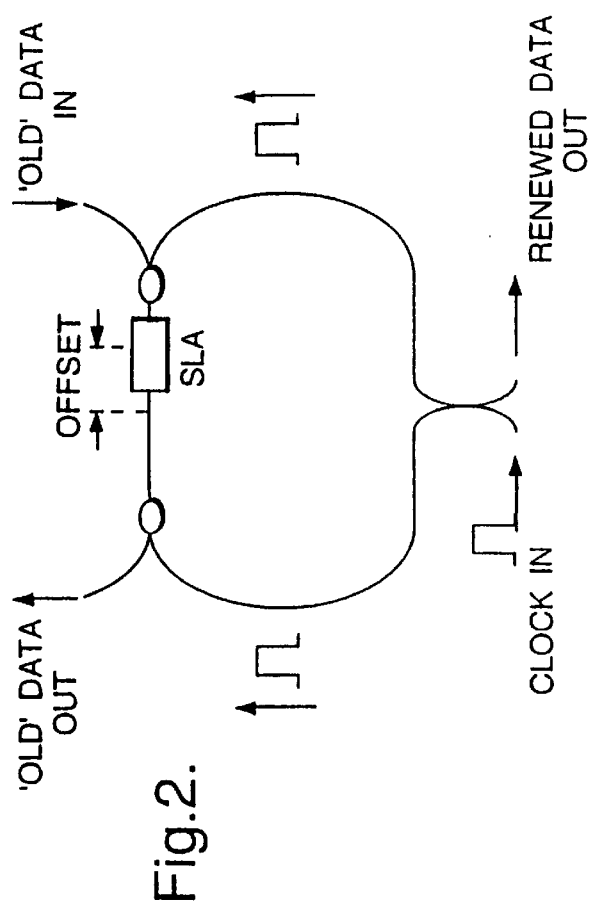
FIG. 2 is a schematic of a synchronisation circuit including a TOAD-configured loop mirror.

FIG. 2 shows a second example of a synchronisation circuit. This example uses a TOAD-configured non-linear loop mirror. As discussed in the above-cited paper by Sokoloff et al, in such a loop mirror a non-linear element NLE, which may be a travelling wave semiconductor optical amplifier such as that available commercially as BT&D SOA3200, is positioned asymmetrically within the fibre loop. An incoming optical signal is split into counter-propagating portions by the fibre coupler 22 at the neck of the loop 21. After through the loop the signal is either reflected back to the input port, or transmitted on through the output port, depending on the relative phase of the counter-propagating signals. That phase relationship is controlled by appropriately timed switching of the NLE in response to a control signal coupled into the loop at a further fibre coupler FC2. In this example, the control signal and the main signal in the loop are at different wavelengths.

The clock signal provides the main input to the loop, and the data signal is coupled into the NLE via the further fibre coupler FC2. The NLE is offset within the loop by an amount corresponding to up to half the pulse separation of the clock signal. This provides a wide switching window. Any pulse in the datastream arriving within the switching window is effective to gate the clock stream and so provides at the output of the loop a replica of the datastream in synchronism with the clock.

What is claimed is:

1. An optical synchronisation circuit comprising:

a) a non-linear optical modulator (NOM) arranged to receive input signals comprising a signal to be synchronised and a reference signal, the NOM producing a spectrally-shifted output signal dependent on the relative timing of the said input signals;

b) optical filter means for producing from the spectrally-shifted output signal an error signal having an amplitude dependent on the spectral shift in the output signal from the NOM; and c) a variable optical delay responsive to the error signal and arranged to apply a variable delay to the said signal to be synchronised.

2. A circuit according to claim 1, in which the NOM comprises an optical fibre (F) arranged to support cross-phase modulation (XPM) between the two said input signals.

3. A circuit according to claim 1 or 2, including a photo-electric detector (3) for converting the error signal into the electrical domain.

4. A circuit according to claim 1, in which the variable optical delay comprises a length of optical fibre mounted on an electromechanical delay stage.

5. A circuit according to claim 1, in which the variable optical delay comprises an array of discretely switchable optical elements.

6. A circuit according to claim 5, in which the said array comprises a plurality of opto-electronic switches coupled in series with respective delay elements and configurable to provide different optical delays.

7. A circuit according to claim 6, in which the different optical delays increase in generally exponential steps.

8. A circuit according to claim 1, in which the variable optical delay comprises:

a variable phase optical signal generator for generating an optical signal having a phase controlled in dependence on the error signal, and a further non-linear optical modulator connected to the output of the optical signal generator and arranged to receive the signal to be synchronised, in use the signal output by the optical signal generator cross-phase modulating the said signal to be synchronised in the further non-linear optical modulator.

9. An optical switch for switching an optical pulse stream including an optical synchronisation circuit according to claim 1 connected on the input side of the switch and arranged to synchronise an incoming optical pulse stream to a reference optical signal.

10. A switch according to claim 9, in which the reference optical signal is the clock signal used to control the optical switch.

11. A method of synchronising optical signals, comprising:

a) applying to a non-linear optical modulator a reference signal and a signal to synchronised, and producing thereby a spectrally-shifted output signal;

b) filtering the spectrally-shifted output signal and producing thereby an error signal having an amplitude dependent on the spectral shift in the output signal from the NOM; and c) applying to the signal to be synchronised an optical delay varied in dependence upon the error signal.

* * * * *